(No Model.)　　　　　　　　　　　　　　　2 Sheets—Sheet 1.
J. J. McGINTY.
COUNTING OR ADDING MACHINE.

No. 562,143.　　　　　　　　　Patented June 16, 1896.

WITNESSES:　　　　　　　　　　　　　　INVENTOR
John Buckler　　　　　　　　　　　　John J. McGinty
L. M. Muller　　　　　　　　　　　　　　BY
　　　　　　　　　　　　　　　Edgar Tate & Co
　　　　　　　　　　　　　　　　ATTORNEYS (No Model.) 2 Sheets—Sheet 2.
J. J. McGINTY.
COUNTING OR ADDING MACHINE.
No. 562,143. Patented June 16, 1896.
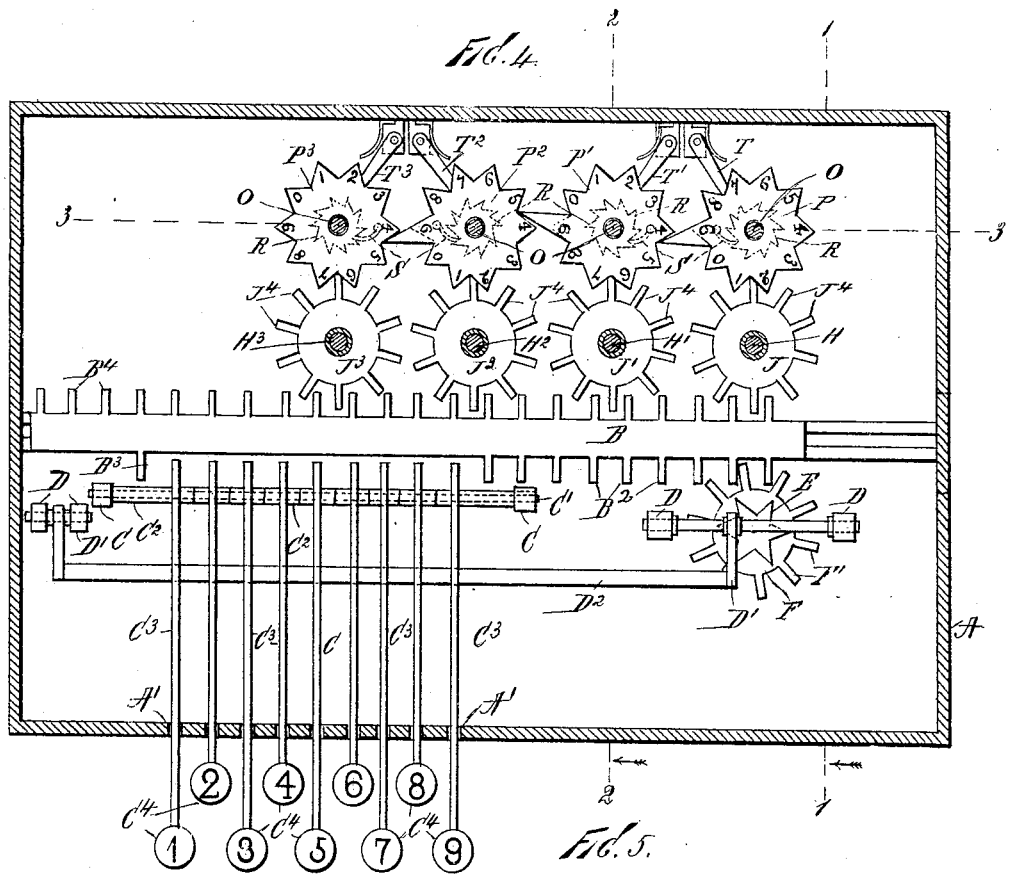
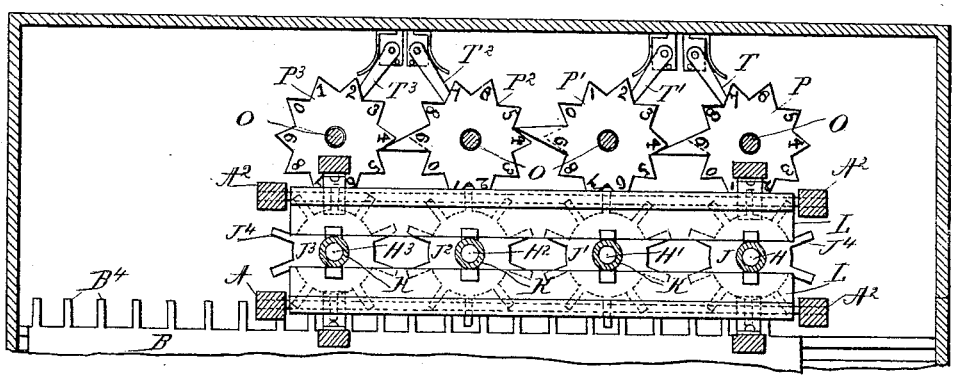
WITNESSES: INVENTOR
John Buckler, John J. McGinty,
L. W. Muller. BY
Edgar Tate & Co
ATTORNEYS

UNITED STATES PATENT OFFICE.

JOHN J. McGINTY, OF NEW YORK, N. Y.

COUNTING OR ADDING MACHINE.

SPECIFICATION forming part of Letters Patent No. 562,143, dated June 16, 1896.

Application filed July 1, 1895. Serial No. 554,555. (No model.)

*To all whom it may concern:*

Be it known that I, JOHN JOSEPH McGINTY, a citizen of the United States, and a resident of New York, county of New York, and State of New York, have invented certain new and useful Improvements in Counting or Adding Machines, of which the following is a specification, reference being had to the accompanying drawings, forming a part thereof, in which similar letters and numerals of reference indicate corresponding parts.

My invention relates to counting or adding machines, and the object thereof is to produce a machine of this character which will be simple in construction and operation, and at the same time enable the operator to add any desired number of figures, or columns, to any desired amount with ease and facility, and also with absolute accuracy.

The invention is fully disclosed in the following specification, of which the accompanying drawings form a part, and in which—

Figure 1:
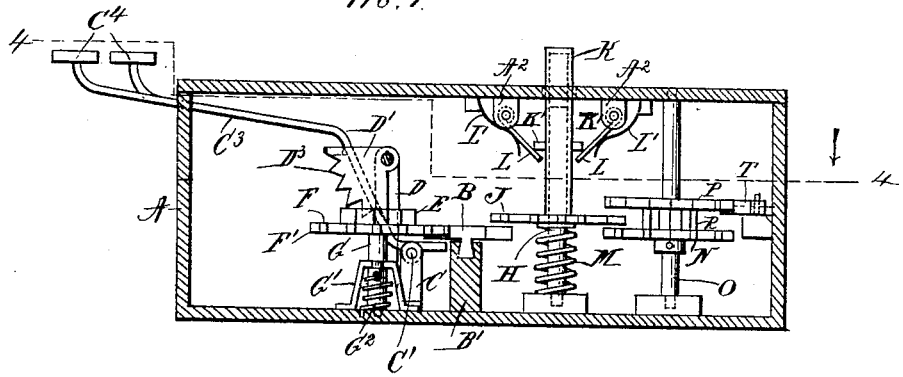
Figure 2:
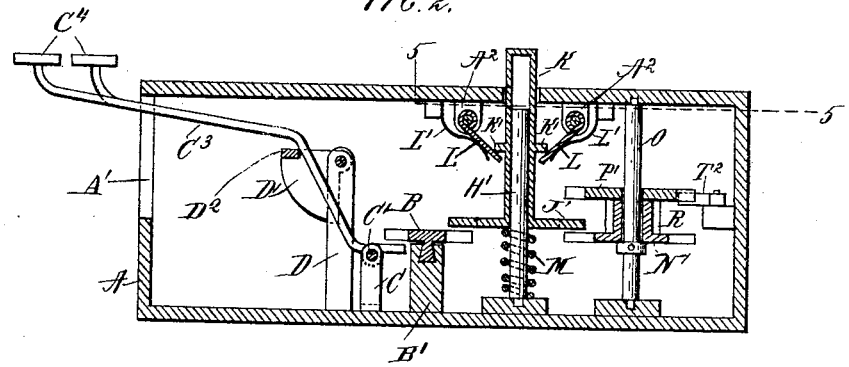
Figure 3:
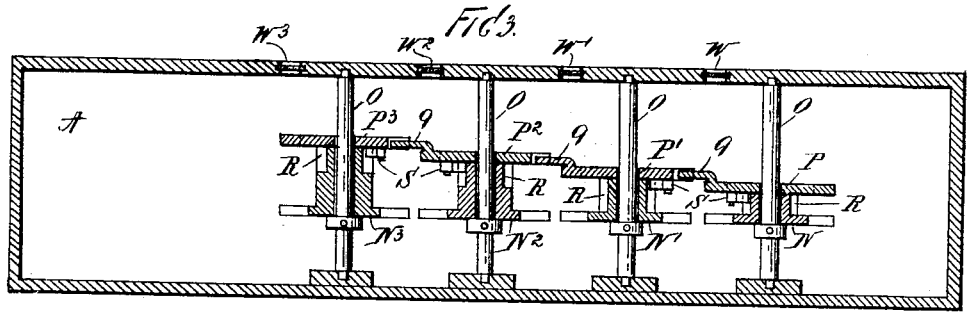

Figure 1 is a transverse section on the line 1 1 of Fig. 4; Fig. 2, a similar section on the line 2 2 of Fig. 4; Fig. 3, a longitudinal vertical section on the line 3 3 of Fig. 4; Fig. 4, a plan view of the machine on the line 4 4 of Fig. 1, and Fig. 5 a section on the line 5 5 of Fig. 2.

In the practice of my invention I employ a rectangular box or casing A, within which, and arranged longitudinally thereof, is a sliding plate or bar B, mounted in a longitudinal support B′, fixed to the base-plate by means of a tongue-and-groove construction, as clearly shown in Figs. 1, 2, and 4.

Supported by means of uprights C, in line with and in front of the sliding bar B, is a rod C′, on which are mounted short tubular sleeves $C^2$, (see Fig. 4,) said sleeves being preferably nine in number, and to each of said sleeves is secured a lever $C^3$, each of which extends outwardly through vertical slots A′ in the case A, and is curved upwardly at the end and provided with a disk or key $C^4$, on each of which is printed one of the numerals from one to nine, said numerals being preferably arranged on said keys in the order shown in Fig. 4, beginning with the left.

Within the casing A, longitudinally thereof and in front of the plate B and the rod C, are vertical supports D, one set of which is arranged near the left-hand side or end of the casing and the other set a short distance from the right-hand end thereof, as shown in Fig. 4, and to these supports are pivoted segmental pieces D′, to the upper outer corners of which is secured a rod or bar $D^2$, which extends longitudinally of the casing and which affords a bearing for the levers $C^3$, as shown in Figs. 1 and 2, which, when the machine is not in operation, holds all of said levers in line and in the elevated position shown in said figures.

One of the segmental pieces D′ is provided with a series of ratchet-teeth $D^3$, preferably six in number, which are adapted to engage with corresponding teeth formed on the wheel E, secured to a wheel F, mounted on a shaft G, mounted vertically in the casing and having a bearing in the bottom thereof and also a second bearing near its middle formed by a spider or frame G′, and between said bearing-points, and within the spider or frame G′, is a helical spring $G^2$, one end of which is secured to said shaft G, and the other end of which is secured to the bottom of the casing. The operation of this spring in its normal position is to hold the shaft G, the wheel F, and the wheel E, mounted thereon, in the position shown in Figs. 1 and 2, in which the levers $C^3$ are in the position shown in said figures and elevated to the highest point.

The wheel F, mounted on the shaft G, and to which the wheel E is secured, is provided with a series of sprockets or projections F′, preferably ten in number, and these sprockets or projections are adapted to engage with corresponding sprockets or projections $B^2$, formed on the front side of the slide-bar B, and also formed on the front side of said sliding bar is a similar sprocket or projection $B^3$, arranged near the left-hand end thereof, as shown in Fig. 4, the purpose of which will be hereinafter explained. The opposite or rear side of the sliding bar B is provided along its entire length with a series of sprockets or projections $B^4$, similar to those on the front side thereof and at the same distance apart, and also similar to those on the wheel F, as shown in Fig. 4.

Mounted rearwardly of the sliding bar B, on vertical shafts H, H′, $H^2$, and $H^3$, are a series of sprocket-wheels J, J′, $J^2$, and $J^3$, each of which is provided with a series of sprockets $J^4$, ten in number, and which correspond with the sprockets or projections on the wheel F, and are adapted to operate in connection with the sprockets or projections $B^4$ on the rear side of the sliding bar B, as will be hereinafter described. Each of the wheels J, $J'$, $J^2$, and $J^3$ is provided with an upwardly-directed tubular extension K, which extends through the top of the case, on which are formed, at a predetermined distance above the wheels, lugs or shoulders $K'$ on opposite sides thereof, and pivotally connected with the top of the casing by means of hangers $A^2$, connected therewith on each side of said tubular extensions K, are spring-operating plates L, which are adapted to be held in contact with said tubular extensions on the lugs or shoulders $K'$, formed thereon, by means of springs $L'$, and below the wheels J, $J'$, $J^2$, and $J^3$, on the shafts H, $H'$, $H^2$, and $H^3$, is mounted a helical spring M, the object of which is to keep the wheels J, $J'$, $J^2$, and $J^3$ elevated and out of contact with the sliding bar B.

Mounted rearwardly of the wheels J, $J'$, $J^2$, and $J^3$, and in transverse line therewith, are a corresponding series of wheels N, $N'$, $N^2$, and $N^3$, (see Figs. 2 and 3,) provided with sprockets or projections which are equal in number and correspond with the sprockets or projections formed on the said wheels J, $J'$, $J^2$, and $J^3$, each of which is mounted on a vertical shaft O, having a bearing in the top and bottom of the casing, as shown in Figs. 1, 2, and 3.

The wheels N, $N'$, $N^2$, and $N^3$ are respectively in transverse line with the wheels J, $J'$, $J^2$, and $J^3$, and in the same plane, and each of said wheels N, $N'$, $N^2$, and $N^3$ is provided with a vertical extending hub, which hubs increase in height from left to right, as shown in Fig. 3, and mounted on said shafts O, above each of said hubs and rotatable independently of the shafts and the hubs, are dial or register wheels P, $P'$, $P^2$, and $P^3$, each of which is provided on its lower surface with a series of ratchet-teeth, ten in number, and on the upper surface of each of which are placed the numerals from "0" to "9," inclusive, as clearly shown in Figs. 4 and 5.

The upper portions of the hubs of the wheels N, $N'$, $N^2$, and $N^3$ are provided with sprocket teeth or projections R, which in the case of of the wheels N and $N^2$ project from left to right, as shown in dotted lines in Fig. 4, and in the case of the wheels $N'$ and $N^3$ project from right to left, as is also shown in dotted lines in said figure. The numerals on the wheels P $P^2$ also run from left to right, whereas those on wheels $P'$ $P^3$ run from right to left.

Each of the wheels P, $P'$, $P^2$, and $P^3$ is provided on its under surface with a spring-pawl S, which is arranged in the manner shown in dotted lines in Fig. 4, and the object of which will be hereinafter explained, and pivotally connected with the back of the casing A are spring-operated pawls T, $T'$, $T^2$, and $T^3$, which engage, respectively, with the ratchets on the wheels P, $P'$, $P^2$, and $P^3$, and which are adapted, respectively, to prevent the wheel P from turning from left to right, the wheel $P'$ from right to left, the wheel $P^2$ from left to right, and the wheel $P^3$ from right to left. It will also be observed that the spring-pawls S on the wheels P, $P'$, $P^2$, and $P^3$ rotate said wheels in the same direction as the wheels N, $N'$, $N^2$, and $N^3$ when said last-named wheels turn so that the sprockets or teeth on the hubs thereof will engage with said spring-pawls, but will also admit of said last-named wheels being turned in the opposite direction without turning the wheels P, $P'$, $P^2$, and $P^3$.

It will be observed that the ninth ratchet tooth or projection on each of the wheels P, $P'$, $P^2$, and $P^3$ is extended so as to contact with the teeth of the adjacent wheel, and the object of increasing the heights of the hubs of the wheels N, $N'$, $N^2$, and $N^3$ from right to left, as shown in Fig. 3, is to allow this extended ratchet tooth or projection to pass over the wheel to the right, but engage with the wheel to the left, as will be readily understood, and as is clearly indicated in said Fig. 3, and by which means each of the wheels is turned one point by the corresponding wheel to the right thereof at each rotation of said wheel, as will be also understood from the foregoing description and the accompanying drawings.

The operation will also be understood from the foregoing description when taken in connection with the accompanying drawings and the following brief statement with reference thereto, it being understood that in the normal condition of the machine before the operation of counting is begun the zero-marks on the wheels P, $P'$, $P^2$, and $P^3$ are all in the line indicated by the dotted line 3 3 in Fig. 4, or in the position occupied by the numerals "9," as shown in said figure, and it being further understood that openings or viewports W, $W'$, $W^2$, and $W^3$ are formed in the top of the casing directly over the zero-marks on the wheels when in this position, it being remembered that in the position of the wheels shown in the drawings the numerals "9" on each wheel are under said view ports or openings, but this position, however, was selected only for the purpose of showing the operation of the extended ratchet teeth or projections 9 in turning the adjacent wheels.

It being desired to add a number or column of figures it is only necessary to press down the tube K of the wheel J at the right of the casing so that the sprockets or projections $J^4$ thereon will engage with the sprockets or projections $B^4$ on the sliding bar B, and also with those on the wheel N. This being done the keys $C^4$, which bear the numerals which correspond with those to be added, are successively depressed, and at each depression of said keys the bar $D^2$ is borne down and the ratchet-teeth $D^3$ on the segment $D'$ contact with the rotating wheel E, which also rotates the wheel F, slides the bar B to the right, as will be readily understood, and said bar will be moved through a number of points corresponding with the number on the key which is pressed down, and the sprocket or projection $B^3$ on the sliding bar coming in contact with the inner end of the lever $C^3$, bearing said key, which will be slightly elevated to admit of this contact and stopping the motion of the bar, as will be readily understood. This operation of the parts specified will be the same regardless of the number of the key pressed down. For instance, if the key $C^4$ be pressed the sprocket or projection $B^3$ will pass through four spaces and strike the inner end of the lever $C^3$, bearing the key $C^4$ numbered "4," and the wheel F will also be turned through four points and the sliding bar B will be moved to the right through four points, and the wheel P will also be moved through four points, and said four points or the numeral "4" will be registered by the wheel P under the view opening or port W.

It will be observed that when the tube K is depressed the lower edges of the spring-operated plates L pass over the shoulders or lugs $K'$ and prevent the upward movement of the tube, and the wheel at the lower end of the tube will remain in the depressed condition until the plates are released, when the spring M will force said wheel out of contact with the sliding bar B and the corresponding wheels N, $N'$, $N^2$, and $N^3$.

When the pressure is removed from the lever or levers $C^3$, the spring $G^2$ operates to throw back the sliding bar B into the normal position by reason of its rotating the wheel F back to its normal position, and in this movement the wheel N will be rotated in the reverse direction, the wheels P $P'$ $P^2$ $P^3$ remaining stationary, as will be understood, seeing that the wheels N P $N'$ $P'$ $N^2$ $P^2$ $N^3$ $P^3$ are in one-way gear by means of pawls S, and the operation of counting may be continued by successively depressing the keys $C^4$, each number being registered in the manner described by the wheel P until "10" is reached, when the wheel $P'$ will be turned through one point, this wheel being turned from right to left by the ratchet or projection 9 on the wheel P, and so on until "100" is reached, when the wheel $P^2$ will be turned through one point, and this process may be continued until "9,999" is reached by the simple addition of separate numerals from "1" to "9."

If it is desired to add in the tens-column, however, it is necessary to depress the tube K, bearing the wheel $J'$, when this wheel will be brought in contact with the sliding bar B, and the corresponding wheel N, and the tube K, bearing the wheel J, will be released by the spring-operated plates L, this release occurring at the time that the tube K on the wheel $J'$ is depressed, and the wheel $J'$ will be held in connection with the sliding bar B and the wheel $N'$ as long as desired or until one of the other tubes K is depressed, when the corresponding wheel mounted thereon will be brought in contact with said bar and the wheel $J'$ released by the operation of the spring M.

It will be understood that when adding either on the units, the tens, the hundreds, or the thousands wheel, which are represented, respectively, by P, $P'$, $P^2$, and $P^3$, the corresponding tubes K are depressed and the wheel mounted thereon brought in contact with the sliding bar and the corresponding wheel of the wheels N, $N'$, $N^2$, and $N^3$, and also that at each movement or depression of the keys $C^4$, or after each of said depressions, the sliding bar B is thrown back by the spring $G^2$, and in this movement any one of the wheels N, $N'$, $N^2$, and $N^3$, which may be in operation at the time, is turned in a reverse direction without affecting the register-wheel. It will thus be apparent that, with the machine shown and described, any number from one to nine thousand nine hundred and ninety-nine may be easily counted and that at any point between one and ten thousand the machine will show the number counted. It will also be evident that the capacity of the machine for counting much higher numbers may be regulated to any desired extent either by increasing the size of the wheels or by adding to the number thereof or by both.

It is evident that many changes in and modifications of the construction shown and described may be made without departing from the spirit of my invention. I therefore reserve the right to include within the scope thereof all such changes and modifications as relate to the form, construction, combination, number, and proportion of the parts and such other modifications and alterations as relate simply to means for connection and the details of construction.

Having fully described my invention, I claim and desire to secure by Letters Patent—

1. In a counting or adding machine, the combination with a casing of a sliding bar mounted therein having sprockets or projections on each side thereof, a series of vertical shafts mounted at the rear of said sliding bar and in line therewith, a series of sprocket-wheels one of which is mounted on each of said shafts, and provided with a tubular extension which extends through the top of the casing, a helical spring mounted on each of said shafts below each of said sprocket-wheels, and means for holding the sprocket-wheel depressed, a series of register-wheels, each of which is mounted on the vertical shaft in line with the first series of shafts, and means for connecting said register-wheels and said sprocket-wheels and for operating the same, substantially as shown and described.

2. In a counting or adding machine, the combination with a casing, of a sliding bar mounted therein, and having sprocket teeth and projections along its rear side and a plurality of sprocket teeth or projections on its front side at one end thereof, a series of key-levers pivotally mounted in said casing at right angles to said bar and extending through vertical slots in the side of the casing, a bar pivotally supported in said casing by means of segmental blocks attached thereto, one of which is provided with ratchet-teeth, a sprocket-wheel mounted on a shaft below said segmental block and having secured thereto a ratchet-wheel adapted to operate in connection with the ratchets formed on said block, a series of register-wheels mounted on vertical shafts at the rear of said sliding bar and in line therewith, and means for connecting said register-wheels and sliding bar and for operating the same, substantially as shown and described.

3. In a counting or adding machine, the combination of a series of vertical shafts arranged in line therein, a series of sprocket-wheels one of which is mounted on each of said shafts, a second series of vertical shafts arranged in line with the first, a series of sprocket-wheels one of which is mounted on each of said second series of shafts, each of which is provided with an upwardly-directed hub which increases in height from right to left, said hubs being each provided with ratchet teeth or projections, a series of ratchet-wheels mounted on each of said last-named series of shafts above the hubs of the sprocket-wheels mounted thereon, and each of which is provided with spring-pawls, on its under surface adapted to engage with the ratchet-teeth on said hubs, and a series of spring-operated pawls pivotally connected with the back of the casing, one of which is adapted to operate in connection with ratchets formed on each of the register-wheels, each of said register-wheels being also provided with ratchet teeth or projections one of which is prolonged or extended and so formed as to come in contact with the ratchet-teeth on the register-wheel on the left thereof, and a series of key-levers pivotally mounted in said casing and extended through vertical slots in the side thereof, and means for connecting and operating said key-levers and register-wheels consisting of a sliding bar arranged within said casing and provided with sprocket-teeth on the rear side thereof adapted to engage and operate the first-named series of sprocket-wheels, said bar being also provided with sprockets or projections on its front side, which sprockets are adapted to be engaged by a sprocket-wheel in operative connection with the key-levers, said parts being constructed, combined, and operated, substantially as shown and described.

In testimony that I claim the foregoing as my invention I have signed my name, in presence of the subscribing witnesses, this 28th day of May, 1895.

JOHN J. McGINTY.

Witnesses:
L. M. MULLER,
C. GERST.